United States Patent Office 3,471,215
Patented Oct. 7, 1969

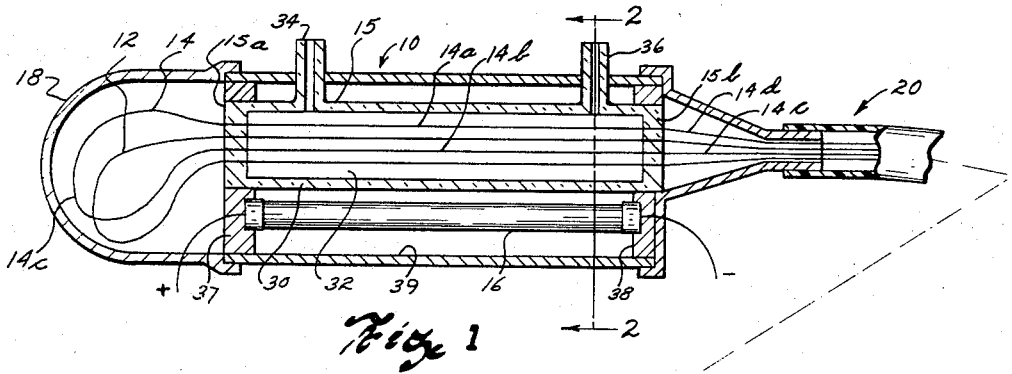
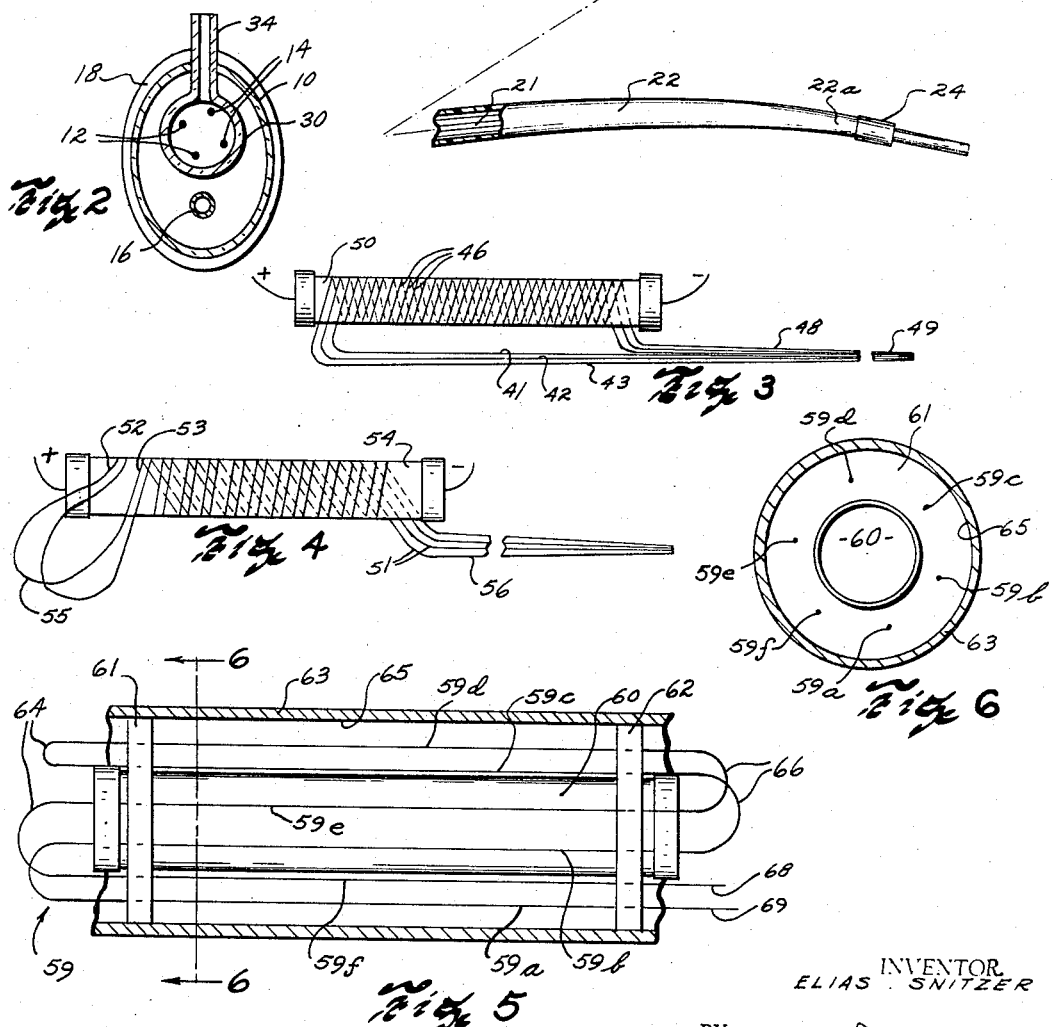

3,471,215
FIBER LASER DEVICE PROVIDED WITH LONG FLEXIBLE ENERGY-DIRECTING PROBE-LIKE STRUCTURE
Elias Snitzer, Sturbridge, Mass., assignor to American Optical Company, Southbridge, Mass., a voluntary association of Massachusetts
Filed July 16, 1965, Ser. No. 472,460
Int. Cl. G02b 5/14; H01s 3/00
U.S. Cl. 350—96     6 Claims

ABSTRACT OF THE DISCLOSURE

Device including fiber laser light-generating means and thin, long, flexible readily manipulatable means for directing high intensity laser energy as a beam of small controlled size onto hard-to-reach parts of body cavities and the like.

---

This invention relates to devices having means for producing and directing a beam of laser generated optical energy of relatively high intensity and of predetermined area onto hard-to-reach regions of body cavities and the like.

More especially, the invention relates to devices of the above character which include in each case fiber optical laser means, preferably but not necessarily formed of glass, for generating a small high intensity beam of laser generated optical energy as well as means in the form of a thin elongated flexible fiber optical component, or bundle of such components, likewise preferably but not necessarily formed of glass, and integral with the said laser energy generating means for guiding the high intensity optical energy along a controlled path to and out through a probe-like structure at an outer exit end of the device; and which elongated structure, because of its thin flexible nature, may be readily disposed adjacent and arranged to efficiently direct such optical energy as a concentrated beam of small controlled size onto selected hard-to-reach parts of body cavities, or the like.

An improved device of the character described may be used for many different purposes. However, it is particularly well suited for special purposes such as, in the field of medicine, the treatment of, or even the destroying of, small selected areas of body tissues, cell clusters and the like.

Resonant cavity laser structures of rod-like form for generating high intensity beams of collimated optical energy are known. Also, elongated clad fiber optical components formed of glass or of plastic and of comparatively small cross-sectional sizes so as to be reliative flexible, for conducting optical energy along controlled paths from one location to another, are known.

It might be thought, therefore, at first consideration, that the output energy from such a laser structure could be readily focused and concentrated by suitable convergent lens means, or the like, directly upon the end of the core of such a thin elongated flexible fiber optical component for transmission therethrough. Or alternatively, it might be thought, should the core of such a single fiber component be too small in cross-sectional size to accept all of the focused light from the laser, that a bundle of such fibers could have its entrance end suitably placed at the image plane of the focused lens so as to accept and conduct all of this energy.

On the contrary, such an alleged arrangement will not perform as satisfactorily as might be expected. For one thing, it would be difficult to properly focus and direct the substantially parallel output beam of an ordinary ruby laser at its full output efficiency into the minute end surface area of the core of a thin flexible glass clad glass core fiber optical component, of say 3 mils outside diameter without producing a "hot spot" which might damage or destroy the component. Likewise, should a bundle of such components be needed instead of a single component in order to be of a size sufficient to accept all parts of the focused laser beam, "hot spots" might still result.

Additionally, since it is desirable for best efficiency to preserve the brightness per unit solid angle of the focused laser light, the beam focusing lens of such an alleged arrangement should be chosen so that the light imaged upon the entrance end of the fiber component completely fills the end of the component (without wasting any part of this focused light) at a numerical aperture for the lens which is substantially equal to the numerical aperture of the fiber component. This is because regardless of whatever the condition of the light imaged upon the incident face of the fiber core is, the light exiting from the opposite end of the core will fill the full numerical aperture of the fiber core.

The numerical aperture of the fiber core is dependent upon the refractive index, $n_1$, of the core and the refractive index, $n_2$, of the surrounding cladding in the following manner:

$$NA_f = \sqrt{n_1^2 - n_2^2}$$

Also, the numerical aperture of the focusing lens is given by the following equation:

$$NA_l = \sin \theta$$

wherein $\theta$ is the half angle of the lens measured from the principal focus of the lens.

With these essential conditions in mind, it would not be an easy matter to obtain, with such an alleged arrangement of parts, the highest possible efficiencies for a laser beam focused upon a single fiber optical component (or even upon a fiber bundle) while still avoiding the "hot spots" already referred to.

A fiber optical component of 3 mils O.D. has been mentioned above, since such a size of glass coated glass fiber optical component has been found to provide easy flexing of the component for its intended purposes. Other sizes of components, larger and smaller, however, are feasible and ones as large as 8 mils have been employed successfully in fiber bundles.

Instead of such a laser rod, lens and flexible fiber component combination as mentioned above for irradiating small hard-to-reach body areas and the like with high intensity laser energy, it is an object of the present invention to provide an improved device comprising one, or a plurality of thin elongated flexible fiber components, each formed of a core of laser glass surrounded by a cladding of a lower refractive index glass and having at least one, and preferably more than one, extended intermediate pump portions adapted to be disposed closely adjacent a high intensity pumping light source, as well as opposite flexible free end portions integral with said pump portion and arranged to extend together in adjacent generally parallel relation outwardly from the pump portion or portions a convenient distance and terminating in a probe-like transmitting exit outer end in such a manner that the laser energy generated in the intermediate pump portion, or portions, can be transmitted at full efficiency to the flexible free end portions and emitted therefrom directly, as desired, onto hard-to-reach areas of body cavities and the like in closed proximity thereto.

In this manner, the difficulties of directing and focusing the high intensity laser beam into the energy-conducting core of small fiber optical components and the difficulties of doing such at highest optical efficiencies without damage to the fiber component or components, are avoided.

Furthermore, when desired, it is possible to enclose said intermediate pump portions of the laser components within a transparent container in which a suitable coolant is confined. It is even possible, if desired, to position the pumping light source also within such a container. And, furthermore, it is possible to arrange the container so that the coolant may be continuously circulated through the container in order to maintain the laser components and associated structure at safe working temperatures; particularly when the laser is being pumped at high repetition rates.

The free end portions of all of the clad laser components are brought together as they leave the pumping region of the device and are contained within a flexible tubing until they reach and are confined within a narrowed-down hollow needle-like member secured to the hollow outer end portion of the tubing. In this manner, the flexible components are protected and their free ends are held closely together so as to emit a concentrated well-defined beam of laser energy at high intensity.

It is, accordingly, an object of the present invention to provide a laser device comprising a pumping light source, one or more thin elongated flexible fiber optical laser components each having at least one extended intermediate pump portion disposed closely adjacent said pumping light source and a pair of free opposite end portions integral with and extending outwardly from the said pump portion convenient distances so as to be used together to jointly form a thin long flexible fiber bundle, and hollow probe-like means at the free end of said bundle for confining the fibers of said bundle and directing the laser light as a concentrated beam out of the device and toward a restricted normally hard-to-reach small body area, or the like, in close proximity thereto.

It is also an object of the present invention to provide one or a plurality of thin elongated flexible fiber optical laser components helically arranged about a flash tube in such a manner as to efficiently present an extended exposed intermediate portion of each component to the pumping light energy for laser light generating purposes and having extended flexible opposite end portions, integral therewith, so arranged as to efficiently conduct this high intensity laser light along a controlled path to a thin hollow probe-like end member which may be easily directed toward normally hard-to-reach body tissues, or the like, to be irradiated thereby.

Other objects and advantages of the invention will become apparent from the detailed description which follows when taken in conjunction with the accompanying drawings in which:

FIG. 1 is a longitudinal sectional view of a laser device embodying the present invention;

FIG. 2 is a cross-sectional view taken substantially upon section line 2—2 of FIG. 1 and looking in the direction of the arrows;

FIG. 3 is a side elevational view showing a modified form of the invention;

FIG. 4 is a similar view showing another modified form of the invention;

FIG. 5 is a fragmentary elevational view with parts of the housing removed to show a different form of the invention; and FIG. 6 is a cross-sectional view taken substantially upon section line 6—6 of FIG. 5 and looking in the direction of the arrows.

Referring to the drawings in detail and in particular FIG. 1, it will be seen that the numeral 10 indicates generally a longitudinally divided two-part main supporting housing within which is disposed one or more thin elongated fiber optical laser components, such as indicated at 12 and 14. Each of these thin elongated fiber optical laser components while not shown in cross section comprises in known manner a core formed of a material, preferably glass, having a known refractive index and embodying an active laser ingredient and this core is surrounded by a clear cladding of a material of lower refractive index, likewise preferably formed of glass. It should be noted that each of these thin elongated fiber optical laser components, as shown at 14a and 14b in FIG. 1, comprises at least two similar intermediate pump portions which are supported in spaced relation to each other by end walls 15a and 15b of an enclosure or container 15 so as to be arranged in generally parallel relation and close proximity to a pumping light source 16, such as a conventional flash tube.

These two intermediate pump portions 14a and 14b of fiber optical component 14 are integrally connected together by a free looped portion 14c contained within a protective end cap part 18 of the housing 10, and this part 18, as shown in FIG. 1, is removable. Also, this fiber optical component 14 has elongated free end portions 14d and 14e integral with intermediate pump portions 14a and 14b, respectively, and both are arranged to extend outwardly in the same direction from the main housing 10 within an extended flexible end assembly 20 for a convenient distance, even two or three feet or more, if desired, depending upon the use to which the device is to be put, and terminate within a rigid or semi-rigid hollow probe-like end member 24.

While only two fiber optical components 12 and 14 have been shown in FIG. 1, an appreciably larger number could be used, if desired, and each would likewise have its opposite free end portions brought together so as to be in adjacent relation within the end assembly 20 and form a flexible fiber optical bundle 21 of the size desired. The individual components of such a fiber optical bundle may be loosely retained within an elongated flexible plastic tubing 22 which, as shown in FIG. 1, has its inner end secured to an extended hollow conical flexible part 28 of a cap member 29 removably secured to and forming a part of the housing 10.

The outer free ends of these fiber optical components, on the other hand, are brought closely together and are enclosed within the hollow, more or less rigid probe-like member 24 to which the outer tapered end part 22a of the plastic tubing 22 is secured. Thus, it is possible to hold the ends of a number of fiber optical components closely together with all substantially parallel and pointed in the same direction so as to emit a small high intensity beam of laser light of a controlled size and shape onto an object area or the like located adjacent member 24.

The end walls 15a and 15b for supporting the intermediate pump portions of all of the fiber optical components may form, if desired, parts of a transparent cylindrically-shaped container 30, as shown in FIGS 1 and 2, which may serve to form a fluid-tight reservoir within which is confined a cooling liquid 32, such as water. In such a case, the fiber optical components 12, 14, etc, where they pass through the end walls 15a and 15b, would be "sealed" as by an epoxy cement applied to each passageway. An alternative arrangement would be to provide a plurality of capillary tubes extending through the end walls and through which the elongated fiber component would be threaded back and forth a like plurality of times. Also, if desired, and as indicated by numerals 34 and 36, this container 30 may be provided with conduits which extend outwardly of the housing 10 and serve to allow the coolant to be pumped into and out of the container therethrough. Spacers are shown at 37 and 38 for supporting the container and flash tube in place within the housing 10.

The elongated tubular container 30, the elongated flash tube 16 and the intermediate pump portions of the fiber optical laser components 12 and 14 are all disposed in generally parallel relation to each other and are surrounded by a specularly reflecting coating or the like 39, preferably of silver, so as to efficiently direct the light from the flash tube toward said intermediate pump portions of the laser components.

In FIG. 3 is shown a modified form of construction wherein a plurality of fiber optical laser components such as 41, 42 and 43 may have intermediate pump portion 46 thereof helically wound about a flash tube 50 for an extended distance and have their opposite integral free end portions 48, as shown, extending together in the same direction as they leave the main housing portion of the device to form a flexible fiber optical bundle 49, like that already described above relative to FIG. 1. While three such components are indicated in FIG. 3, it should be appreciated that any convenient number of such components may be employed and disposed in generally parallel relation to each other as they are helically arranged to traverse the flash tube; and as many as eight, ten or even a dozen components at a time might be contemplated. Of course, the free ends of all of these components would terminate within a hollow probe-like member similar to that shown at 24 in FIG. 1.

In FIG. 4, a slightly different modification of the invention is shown and comprises a construction wherein one or more flexible fiber optical laser components 51 are used. In this modification, each of these components has a pair of intermediate pump portions 52 and 53 arranged in similar helically coiled generally parallel relation around an elongated flash tube 54, and these portions are integrally connected together by a looped portion 55. In a manner similar to that described in FIG. 1, such laser components would have their opposite free end portions 56 arranged to extend in the same direction and would be brought together to form a flexible fiber bundle which terminates within a hollow probe-like member, similar to that indicated at 24 in FIG. 1. Here again, only a pair of flexible laser components are shown, but it should be appreciated that any suitable number of such components could be employed, as desired, and such particularly depending upon the cross-sectional size of the laser beam desired therefrom.

In FIGS. 5 and 6 is shown a further modified form of construction embodying the present invention. Here a single fiber optical laser component 59 is used and is folded back upon itself a number of times within the main supporting housing of the device so as to provide a plurality of extended intermediate pump portions 59a, 59b, 59c, 59d, 59e and 59f arranged in generally parallel relation to each other about a flash tube 60 and supported by a pair of spacers 61 and 62 within a housing 63. These intermediate pump portions are integrally connected together by looped portions, as indicated at 64 and 66. Also, the opposite free end portions 68 and 69 of the component are shown extending outwardly of the housing in the same direction, and same would then be arranged to form a flexible bundle, in the same manner as in FIG. 1.

In FIGS. 5 and 6, the intermediate pump portions of component 59 are shown evenly spaced about the flash tube 62 and outwardly thereof is provided a cylindrically-shaped reflecting surface 65. While a single elongated fiber optical laser component has been shown in a "folded" arrangement in FIGS. 5 and 6, it will be readily appreciated that a plurality of such components could be similarly employed about the flash tube and all arranged to extend in a generally parallel folded side-by-side relation to one another.

Having described my invention, I claim:

1. A device for use in producing and directing laser energy at relatively high unit intensity onto small hard-to-reach areas of body cavities, and the like, said device comprising a main body housing and an elongated flexible tubular part extending outwardly from one end of said main body housing and having a hollow comparatively rigid probe-like member carried by its outer end, an elongated pumping light source within said main body housing at least one thin elongated fiber-like component having a pair of opposite end portions and an extended intermediate pump portion within said main body housing and disposed in closely adjacent relation to said pumping light source throughout the greater part of the length thereof, said intermediate pump portion of said fiber-like component being integrally connected to said pair of elongated opposite end portions, said fiber-like component having at least one thin elongated core formed of a transparent laser material of a predetermined refractive index surrounded by a cladding of a transparent material of a lower predetermined refractive index in contacting relation therewith, the integral opposite end portions of said fiber laser component extending outwardly of said main body housing and into said flexible tubular part in adjacent relation to each other and together forming a flexible fiber bundle which terminates within said hollow probe-like member, highly specularly reflecting means surrounding said light source and the intermediate portion of said laser component and serving to direct pumping optical energy from said light source to said intermediate portion, and an optically finished exit surface formed upon the end of said bundle within said probe-like member for allowing a beam of laser light of controlled cross-sectional size to pass outwardly therethrough.

2. A device for use in producing and directing laser energy at relatively high unit intensity onto small hard-to-reach areas of body cavities, and the like, said device comprising a main body housing and an elongated flexible tubular part extending outwardly from one end of said main body housing and having a hollow comparatively rigid probe-like member carried by its outer end, an elongated pumping light source within said main body housing, at least one thin elongated fiber laser component having a plurality of extended intermediate pump portions and opposite end portions, said plurality of extended intermediate pump portions being within said main body housing and disposed in closely adjacent relation to said pumping light source throughout the greater part of the length thereof, said intermediate pump portions being integrally connected to each other by interconnecting portions of said component, and the opposite end portions of said component extending outwardly from said main body housing and into said flexible tubular part in adjacent relation to each other and together forming a flexible fiber bundle which terminates within said hollow probe-like member, said fiber optical component having at least one thin elongated core formed of a transparent laser material of a predetermined refractive index surrounded by a cladding of a transparent material of a lower predetermined refractive index in contacting relation therewith, highly specularly reflecting means surrounding said light source and the intermediate portions of said laser component and serving to direct pumping optical energy from said light source to said intermediate portions, and an optically finished exit surface formed upon the end of said bundle within said probe-like member for allowing a beam of laser light of controlled cross-sectional size to pass outwardly therethrough.

3. A device as defined in claim 1 and wherein said intermediate pump portion is of helical shape and disposed about said elongated pumping light source throughout the greater part of the length thereof.

4. A device as defined in claim 2 and wherein said intermediate pump portions are of helical shape and disposed about said elongated pumping light source throughout the greater part of the length thereof.

5. The combination defined in claim 1 including a container disposed within said main body housing and encircling said extended intermediate pump portion, and a liquid coolant within said container and in surrounding relation to said extended intermediate pump portion.

6. The combination defined in claim 5 including ports for allowing said liquid coolant to be continuously circulated through said container.

References Cited

UNITED STATES PATENTS

| | | |
|---|---|---|
| 3,273,072 | 9/1966 | Koester et al. |
| 3,315,680 | 4/1967 | Silbertrust et al. |
| 3,354,405 | 11/1967 | Bebb et al. _____ 350—96 X |
| 3,356,966 | 12/1967 | Miller. |

JOHN K. CORBIN, Primary Examiner

U.S. Cl. X.R.

128—398; 331—94.5